United States Patent
Erb et al.

(10) Patent No.: US 10,009,437 B2
(45) Date of Patent: Jun. 26, 2018

(54) MEDIA DELIVERY BY PREFERRED COMMUNICATION FORMAT

(75) Inventors: Paul Andrew Erb, Ottawa (CA); Peter Matthew Hillier, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 797 days.

(21) Appl. No.: 13/373,610

(22) Filed: Nov. 21, 2011

(65) Prior Publication Data

US 2013/0132589 A1     May 23, 2013

(51) Int. Cl.
*H04L 29/08*     (2006.01)
*H04M 1/725*     (2006.01)

(52) U.S. Cl.
CPC ........ *H04L 67/2823* (2013.01); *H04L 67/306* (2013.01); *H04M 1/72547* (2013.01); *H04M 1/72569* (2013.01)

(58) Field of Classification Search
CPC .... H04L 67/2823; H04L 67/306; H04L 67/22
USPC ...................................................... 455/414.4
See application file for complete search history.

(56) References Cited

U.S. PATENT DOCUMENTS

| | | | | |
|---|---|---|---|---|
| 6,453,294 B1 * | 9/2002 | Dutta | ...................... | G10L 21/06 704/235 |
| 7,284,046 B1 * | 10/2007 | Kreiner et al. | ............... | 709/223 |
| 7,596,369 B2 * | 9/2009 | Alperin et al. | ............ | 455/414.4 |
| 7,817,987 B2 * | 10/2010 | Mian et al. | ................ | 455/412.2 |
| 7,912,187 B1 * | 3/2011 | Mikan et al. | .............. | 379/88.14 |
| 8,031,694 B2 * | 10/2011 | Gidron et al. | ................ | 370/350 |
| 8,050,660 B2 * | 11/2011 | Mian et al. | ................. | 455/412.1 |
| 8,325,883 B2 * | 12/2012 | Schultz et al. | .................. | 379/52 |
| 8,358,752 B2 * | 1/2013 | Shaw et al. | ................ | 379/88.14 |
| 2003/0028601 A1 * | 2/2003 | Rowe | .................... | H04M 3/493 709/206 |
| 2006/0193450 A1 * | 8/2006 | Flynt et al. | ................ | 379/88.13 |
| 2007/0230674 A1 * | 10/2007 | Altberg | ................ | H04M 15/00 379/114.01 |
| 2007/0239880 A1 * | 10/2007 | Alperin | ............... | H04L 65/1069 709/230 |
| 2008/0021976 A1 | 1/2008 | Chen et al. | | |
| 2009/0112971 A1 | 4/2009 | Mustafa | | |

(Continued)

FOREIGN PATENT DOCUMENTS

EP          2378436 A1     10/2011
WO    WO 2010/023192 A2    3/2010

*Primary Examiner* — Aftab N. Khan

(57) ABSTRACT

The present disclosure relates to communication formats and more particularly, to media delivery by preferred communication formats. In one illustrative embodiment, communications between an originator and receiver can be converted into a format preference based on the receiver's context. The context can refer to device type, application usage, time of day, location and user role. The originator can be free to choose their desired format of communication and the recipient can be equally free to choose the best suited format to receive the message. In outgoing communications, the receiver can use their own defined format and the communications can be converted into the originator's chosen format. Media format conversion can be performed unilaterally, for example, the first person can send an email which can be translated to speech for the second person who responds by voice which can be received as voice by the first person.

4 Claims, 2 Drawing Sheets

(56) References Cited

U.S. PATENT DOCUMENTS

2011/0170675 A1* 7/2011 Mikan ................ H04L 12/5815
379/88.14

* cited by examiner

MEDIA DELIVERY BY PREFERRED COMMUNICATION FORMAT

TECHNICAL FIELD

This disclosure generally relates to communications, and more particularly, to converting messages between different formats without user intervention.

BACKGROUND

Communications can involve a wide variety of device types from which messages can be sent and received. These devices can include collaborative appliances, mobile phones, tablets, laptops, desktops and cloud computing devices. As communications evolve, a large number of formats for which messages are sent and received can be used. These can include audio calls, voicemail, emails, chat (for example, texting), Google Talk®, and posts (for example, Twitter® and other social networking sites).

Furthermore, users can have more than one role for receiving messages. For example, different aliases can be used by the user for which messages are appropriate. These aliases can include friend, family member, company employee, job seeker, student, hobbyist, collector and consumer. As the number of communication combinations increase, the more challenging it can be for a user to manage their communications.

To handles these different forms of communications, portal capabilities or applications are capable of accessing more than one form of communication on a same device. For example, a tablet device or smart phone with associated capabilities and applications can be used to access their messages for different aliases. However, this can involve considerable effort to manage. In addition, these would not be obtainable when their primary computing device is not available.

Users can also decide to not use or opt out of communication mechanisms that are inconvenient or less rewarding. Some communication mechanisms can be used infrequently as time or inclination permits. Products can be available that convert communications between voice and text, however, these can be limited in scope and are applied statically.

A need therefore exists for a system and method for media delivery by preferred communication format that overcome those issues described above. These, as well as other related advantages, will be described in the present disclosure.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

Figure 1:
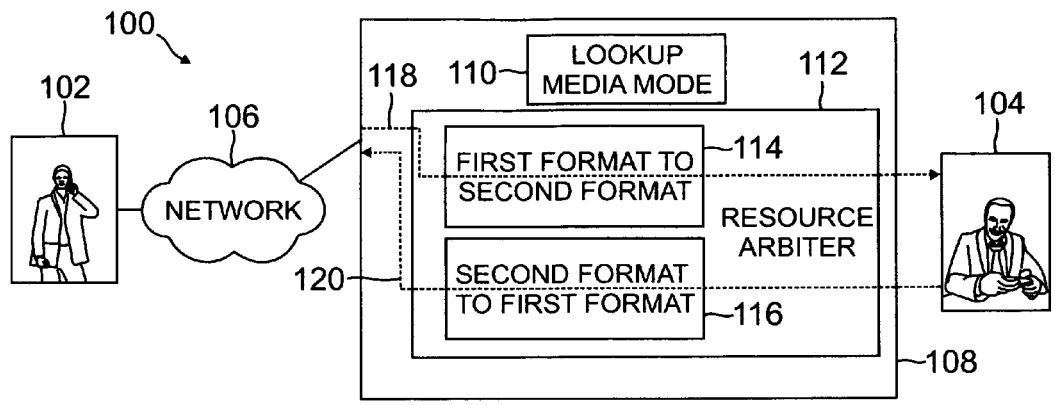
FIG. 1 is an exemplary system for delivering media by preferred communication format in accordance with one or more aspects of the present disclosure.

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

The present disclosure relates to communication formats and more particularly, to media delivery by preferred communication formats. In one illustrative embodiment, communications between an originator and receiver can be converted into a format preference based on the receiver's context. The context can refer to device type, application usage, time of day, location and user role. The originator can be free to choose their desired format of communication and the recipient can be equally free to choose the best suited format to receive the message. In outgoing communications, the receiver can use their own defined format and the communications can be converted into the originator's chosen format. Media format conversion can be performed unilaterally, for example, the first person can send an email which can be translated to speech for the second person who responds by voice which can be received as voice by the first person.

Numerous advantages can be offered by the illustrative embodiment described above. Collaboration formats from multiple parties can be utilized seamlessly. Furthermore, complex technological and business relationships can be set up through different formats. The features described herein can be used for numerous types of devices and be integrated into public network providers. A combination of one or more media formats can be converted to another combination of one or more media formats. For example, audio and video can be converted to descriptive text subject to the availability of appropriate translation components. Many additional advantages of the present disclosure will become apparent to those skilled in the relevant art as provided for in the following description.

In the present disclosure, communication and media formats can refer to audio calls, voicemails, emails, chat and posts. A chat session can occur through Short Message Service (SMS), Google Talk®, etc., while posts can be provided on Twitter® or other social networking sites. Formats can also include news and advertising. Other types of formats can exist and are within the scope of this disclosure. Formatting different communications can occur on a number of devices including, but not limited to, collaborative appliances, mobile phones, table computer devices, laptops, desktops and cloud computing devices. Communications can also be referred to as media.

Referring to FIG. 1, an exemplary system 100 depicting media delivery by preferred communication format in accordance with one or more aspects of the present disclosure is shown. The system 100 can include an originator 102 of the media and a receiver 104. The originator 102 can also be referred to as the caller while the receiver 104 can be termed called party. The originator 102 and receiver 104 can each have a communication device. These communication devices can include, but are not limited to, a tablet, mobile phone, smartphone, personal digital assistant, handheld computer, standalone computer, conference device or the like. While the originator 102 can be the party who initiates the communication session, this is not necessary. Furthermore, the receiver 104 does not necessarily have to be the party in waiting, but can also provide outgoing communications and can initiate the communication session.

The originator 102 and the receiver 104 can communicate with one another through a network 106. The network 106 can include a Public Switched Telephone Network (PSTN), a private network through a Private Branch Exchange (PBX) or combination of both. Communications can take place wirelessly or through a wireline connection. Those skilled in the relevant art will appreciate that many types of networks 106 can be used. Other networks 106 can include, but are not limited to, a local area network (LAN), wide area network (WAN), personal area network (PAN), campus area network (CAN), metropolitan area network (MAN), global area network (GAN) or combination thereof. Such networking environments are commonplace in office networks, enterprise-wide computer networks, intranets and the Internet, which are all types of networks.

A number of protocols can be used to receive and provide communications over the network 106. Session control protocols to control the set-up and tear-down of communications can be implemented. Codecs which encode communications allowing transmission over a network 106 as digital communications via a stream can also be provided. Codec use can be varied between different implementations of communications over the network 106. Some implementations rely on narrowband and compressed communications, while others support high fidelity codecs. Numerous types of protocols exist, which are known to those skilled in the relevant art.

As shown in FIG. 1, the system 100 can include a communication module 108. The module 108 can be placed on either side of the network 106. In one embodiment, the module 108 can be placed within the communication device operated by the receiver 104. More than one communication module 108 can also be used for converting formats. For example, the originator 102 can have one communication module 108, while the receiver 104 can have their own.

The communication module 108 can also operate on a traditional, proxy or web server. In one embodiment, the module 108 can function on a PBX, known to those skilled in the relevant art. The server or PBX can include an operating system and software instructions, ROM, RAM, at least one processor, network interface and data storage. The server or PBX can process communications from the user devices or any other component within the system 100. The server or PBX can typically handle high volumes of transactions and large amount of queries for communication and data processing. RAM and ROM are used to support the program codes that are operated by the processor. The memory can be in a form of a hard disk, CD ROM, or equivalent storage medium. The processor can support authentications such as communications from external data servers, as well as allowing for anonymous transactions and general data encryption.

The communication module 108 can include a lookup media mode 110. The mode 110 can be setup dynamically or statically. The mode 110 can determine a user's context and provide a format for communications based on the context. This mode 110 can perform a lookup to determine current communication preferences, for example, whether the receiver 104 is using voicemail or text. In one embodiment, a receiver 104 can provide their preferences before any incoming communications 118 are received. For example, a receiver 104 can provide that incoming communications 118 in different formats be converted to text when the receiver 104 is in a meeting. This type of mode 110 can be referred to as a pre-processing mode. In a post-processing mode 110, the preferences can be established after a communication is received by the originator 102. The mode 110 can consult with a database that can be attached to the communication module 108. The database can store preferences for a context.

In one embodiment, presence features can be incorporated into the communication module 108. The presence features can be used in combination with the context. For example, the communication module 108 can track the presence of the receiver 104 at their office and provide an appropriate format for incoming communications 118. Other presence features can include a calendar application or Global Positioning System (GPS) for tracking. Those skilled in the relevant art will appreciate that the lookup media mode 110 can use a number of different techniques for determining preferences and will become apparent from the discussion provided below.

When configuring the lookup media mode 110, the receiver 104 can choose any communication format they desire and send a message normally. When receiving a message, the desired format can be determined for the receiver 104 and the message can be automatically converted. Delivery filtering can be optionally applied based on the current context of the receiver 104.

The communication module 108 can include a resource arbiter 112. The resource arbiter 112 can be connected to the lookup media module 110. The resource arbiter 112 can handle bi-directional communications while converting formats, for example, a first format of voice to a second format of text. The resource arbiter 112 can include a number of media converters 114 and 116, usable either independently or in combination (chainable). For purposes of illustration, two media converters 114 and 116 have been shown. A first converter 114 can change incoming communications 118 received in a first format to a second format, while the second converter 116 can convert outgoing communications 120 from a second format to a first format. Generally, the first format can represent any format chosen by the originator 102, while the second format can be determined by the lookup media mode 110 that can be established by the receiver 104.

While described as supporting bi-direction communications, the resource arbiter 112 can also provide unilateral communications. For example, the resource arbiter 112 can convert the first format into the second format through media converter 114 only while leaving media converter 116 out. This can force the originator 102 to convert any of their own communications, if necessary. For example, the originator 102 can send an email which can be translated to speech for the receiver 104 who responds by voice which can be received as voice by the originator 102. A combination of one or more media formats can be converted to another combination of one or more media formats. For example, audio and video can be converted to descriptive text subject to the availability of appropriate translation components.

Media translation resources can be provided in the form of the media converters 114 and 116. These resources can be allocated when a communication session is established between the parties. When parties stop communicating, the media translation resources can be removed. While the communication module 108 encompassed many of the features presented above, the lookup media mode 110 and converters 114 and 116 can be distributed among different locations and do not have to be placed in a centralized component. The converters 114 and 116 can also be placed over distributed components and not only within the resource arbiter 112. For example, the converters 114 and 116 can be provided within each user's device or can be implemented through proxy.

The communication module 108 can be connected to a plurality of parties, that is, more than two. Each of these parties can communicate in a different format and the module 108 can convert these formats into a format used by the receiver 104. For example, a first originator 102 can call the receiver 104 using audio and a second originator 102 can contact the receiver 104 through a post on Twitter®. Both communications from the originators 102 can be converted to text as specified in the lookup media mode 110 when sent to the receiver 104. Outgoing communications 120 from the receiver 104 can be converted into the format which was received from the originators 102 so that a response by the receiver 104 can be converted to audio for the first originator 102 and a post for the second originator 102. Multi-user conversions to and from multiple media forms can be implemented, for example, a conference involving participants who called in, email in, join in a text chat room, etc.

The communication module 108 can incorporate a variety of techniques to process incoming communications 118 and outgoing communications 120. In one embodiment, store-and-forward techniques can be used. For example, an incoming call can be received by the module 108 and converted to a text message that can be stored. When the receiver 104 becomes available, the stored text message can be sent to the receiver 104. Real-time communications can also be provided by the communication module 108 with the module 108 having sufficient system capabilities to perform message conversion.

Figure 2:
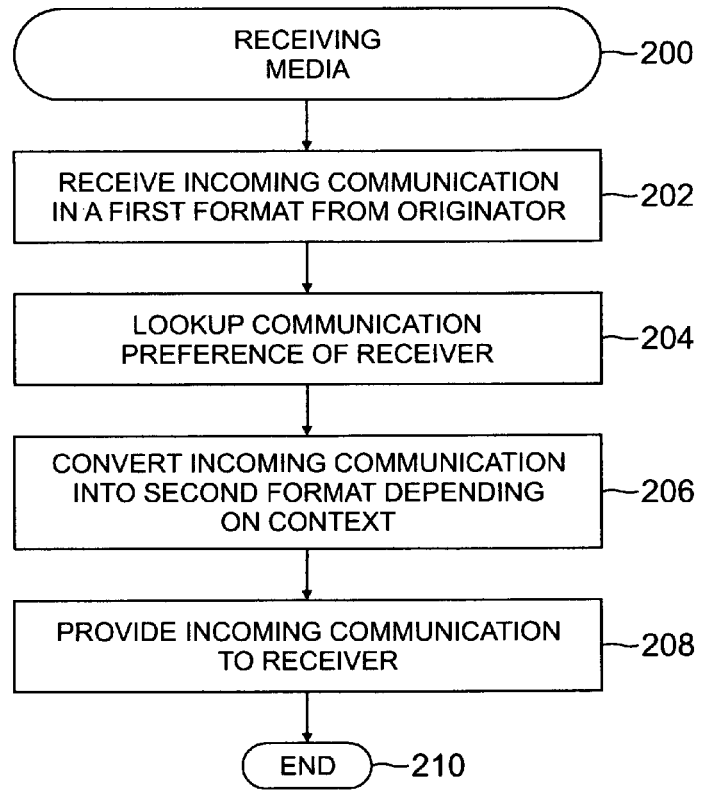
FIG. 2 is a flow chart depicting illustrative processes for receiving media in accordance with one or more aspects of the present disclosure.
Figure 3:
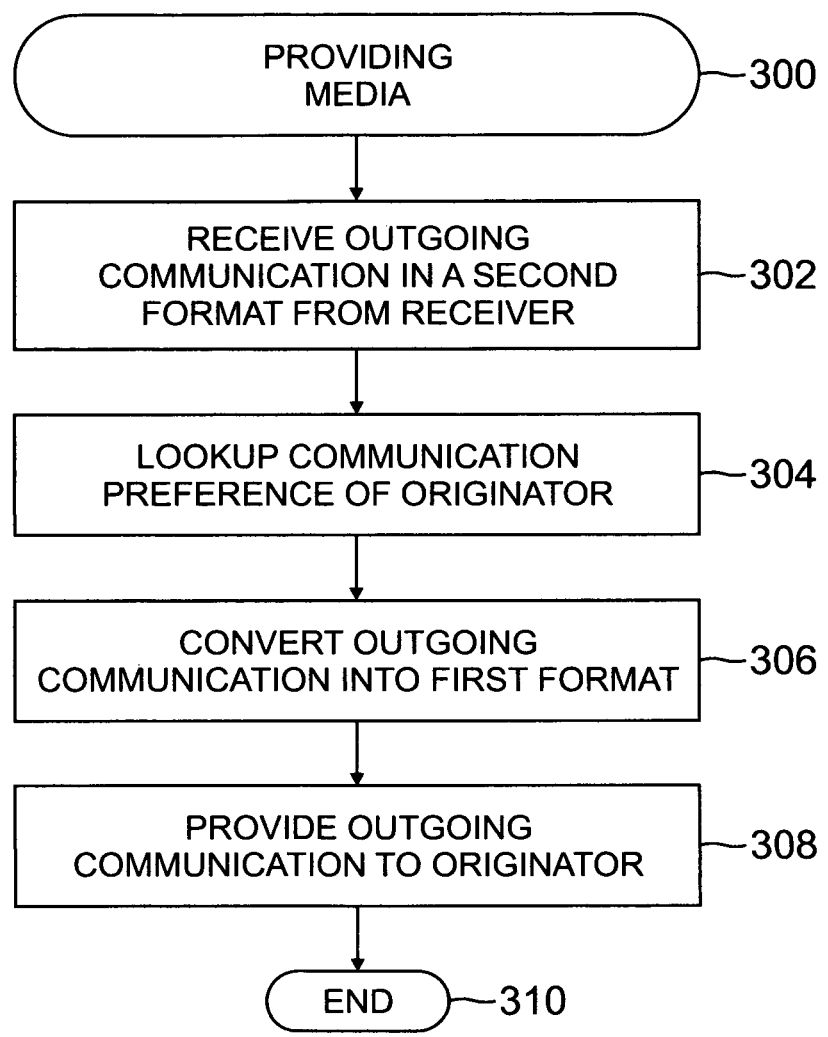
FIG. 3 is a flow chart depicting illustrative processes for providing media in accordance with one or more aspects of the present disclosure.

Turning to FIGS. 2 and 3, processes for establishing a communication session will now be described with respect to the system 100 provided in FIG. 1. The originator 102 in the following illustration does not necessarily have to begin the communication session nor does the receiver 104 have to be the one that receives the call. For incoming communications 118, FIG. 2 is a flow chart depicting illustrative processes for receiving media in accordance with one or more aspects of the present disclosure. The processes can begin at block 200.

The originator 102 of the communication session can communicate with the receiver 104. The originator 102 can be on their mobile device and can choose to initiate the communication using voice, email, text, chat, video or social media. The originator 102 can opt to make a voice call in this example and the mobile device can dial the receiver's contact number. At block 202, the communication module 108 can interact with the incoming communication 118 on behalf of the receiver 104. The incoming communication 118 can be received in a first format. The communication module 108 can reside on the receiver's personal computer, laptop, smartphone and other personal devices to synchronize their communication preferences. The module 108 can also be placed on a proxy server, server or the like.

The communication module 108, at block 204, can detect the incoming call 118 from the originator 102 and can perform a lookup to determine the receiver's current communication preference through the lookup media mode 110. In one embodiment, a schedule based lookup can determine that the receiver 104 is in a meeting and that their settings are to use texting for business contacts, voice call for their boss, and voicemail for all other calls. There can be a number of ways the service can be provided, but in this example, an end client based solution is provided, but a centralized service concept can be easily applied.

In one embodiment, the communication module 108 can employ a strategy such as cut through audio to inform the originator that the incoming communication 118 is being converted. This can be provided by a generic announcement, special tone or specialized announcement based on the receiver's preference or the communication media involved. For example, the receiver 104 can record a message which states "I appreciate your communication and am having it converted in a way that I can answer you now instead of getting back to you later". Alternately, a generic greeting "The person you have reached is using media conversion to answer your communication" can be used.

At block 206, the incoming communication 118 can be converted into a second format depending on user preferences or context through converter 114. In one embodiment, the communication module 108 can notify the receiver 104 using their text interface that the originator 102 is waiting to communicate with the receiver 104. The receiver 104 can accept the session by beginning their reply. The receiver 104 can also choose to decline the communication, in this example, by closing their text interface. The module 108 can also bind together the media translation resources required to handle the call. For the originator 102 to communicate with the receiver 104, voice-to-text can be utilized. The converted communications can be provided to the receiver 104 at block 208. The processes can end at block 210.

Referring now to FIG. 3, a flow chart depicting illustrative processes for providing media in accordance with one or more aspects of the present disclosure is shown. The processes can begin at block 300. In one embodiment, the outgoing communication 120 is generally provided the same way it came in through the communication module 108, that is, in text form. Those skilled in the relevant art will appreciate, however, that other formats for the communication can be provided and can be easily converted.

At block 302, the outgoing communication 120 can be received in a second format from the receiver 104. The communication does not necessarily have to be in the second, format. The communication module 108 can lookup communication preferences of the originator 102 at block 304. The module 108 can keep track of the format for the incoming communication 118. Continuing with the illustration provided above, when the receiver 104 sends a text to the originator 102, text-to-voice software can be utilized through converter 116 within the resource arbiter 112.

At block 306, the outgoing communication 120 can be converted into the first format, that is, audio. The outgoing communications 120 can be provided to the originator 102 at block 308. Once the communication is terminated, by either party, the media translation resources can be released. The processes can end at block 310. With regard to the media translation sources, they can be allocated and de-allocated when used rather than dedicated. Users can also change media used during the communication as desired.

In one embodiment, the originator 102 can be presented with a recording, silence or music when the incoming communication 118 is being converted or the outgoing communication 120 is being provided as a large portion of the communication can be idle while the receiver 104 composes their replies. Depending on the interconnection of communication types, delays can preclude true "real time" communications. For example, voice-to-email can encounter long delays due to the nature of the email server. In this illustration, a callback type service can be employed. For example, the originator 102 can communicate what is needed and terminate the call. The receiver 104 can get the email and compose a reply. The originator 102 can then be "called back" and the receiver's email can be translated to voice to the originator 102.

Those features presented above can be placed in a number of other embodiments. For example, while a receiver 104 is on their personal computer, the receiver 104 can prefer to have chat sessions when their desk phone is in use, for example, they are on the phone listening in on a conference call, but still want to get other calls. A call to the receiver 104 can be directed by the communication module 108 to the chat session on their personal computer. The receiver 104 can then answer the call by acknowledging the chat session and speech-to-text/text-to-speech can be applied to provide two way communications between the receiver 104 and the originator 102.

In one embodiment, the communication module 108 within the system 100 can be connected with more than two parties. Typical audio conferencing can be leveraged to create a conference between a number of parties using varying interfaces such as audio, chat, text and social media. Communications from the participants can be translated between their desired interface and voice. Voice mixing can then be provided to the participants.

Other variations can also be accounted for and are within the scope of the present disclosure. The communication module 108 can convert incoming communications 118 from other originators 102 and provide the incoming communications 118 to other originators 102 in a format defined by themselves or in which an incoming communication 118 is received by an originator 102. For example, a first originator 102 can provide incoming communications 118 to the receiver 104 in audio and the communication module 108 can convert it to text for the receiver 104. A second originator 102 can provide incoming communications 118 to the receiver 104 in a post and the communication module 108 can convert it to text. The incoming communications 118 provided by the second originator 102 can be converted to audio based on the format received from the incoming communications 118 of the first originator 102. The audio can then be provided to the first originator 102.

The data structures and code, in which the present disclosure can be implemented, can typically be stored on a non-transitory computer-readable storage medium. The storage can be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the disclosure can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The technology described herein can be implemented as logical operations and/or modules. The logical operations can be implemented as a sequence of processor-implemented executed steps and as interconnected machine or circuit modules. Likewise, the descriptions of various component modules can be provided in terms of operations executed or effected by the modules. The resulting implementation is a matter of choice, dependent on the performance requirements of the underlying system implementing the described technology. Accordingly, the logical operations making up the embodiment of the technology described herein are referred to variously as operations, steps, objects, or modules. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method comprising:
   during a call between a communication module and a first device the communication module receiving communications from the first device in an audio call format;
   the communication module identifying that said call has been terminated;

the communication module converting said communications received in said audio call format into a text format;

the communication module providing said communications converted into said text format to a second device;

the communication module receiving communications from said second device in said text format;

the communication module converting said communications received from said second device into said audio call format; and the communication module providing said communications converted into said audio call format to said first device;

wherein the step of providing said communications converted into said audio call format to said first device comprises the communication module initiating a call back to said first device.

2. The method of claim 1, wherein providing said communications converted into said text format to said second device comprises sending said converted communications using store-and-forward techniques.

3. A non-transient computer readable medium containing program instructions for causing a computer to perform the method of:

during a call between a communication module and a first device the communication module receiving communications from the first device in an audio call format;

the communication module identifying that said call has been terminated;

the communication module converting said communications received in said audio call format into a text format;

the communication module providing said communications converted into said text format to a second device;

the communication module receiving communications from said second device in said text format;

the communication module converting said communications received from said second device into said audio call format; and the communication module providing said communications converted into said audio call format to said first device;

wherein the step of providing said communications converted into said audio call format to said first device comprises the communication module initiating a call back to said first device.

4. The non-transient computer readable medium according to claim 3, further containing program instructions for sending said communications converted into said text format to said second device using store-and-forward techniques.

* * * * *